United States Patent
Pensak et al.

(10) Patent No.: US 7,370,319 B2
(45) Date of Patent: May 6, 2008

(54) SYSTEM AND METHOD FOR REGULATING EXECUTION OF COMPUTER SOFTWARE

(75) Inventors: David A. Pensak, Westchester, PA (US); Douglas C. Merrell, San Jose, CA (US)

(73) Assignee: V.i. Laboratories, Inc., Waltham, MA (US)

( * ) Notice: Subject to any disclaimer, the term of this patent is extended or adjusted under 35 U.S.C. 154(b) by 712 days.

(21) Appl. No.: 10/774,368

(22) Filed: Feb. 10, 2004

(65) Prior Publication Data

US 2004/0181772 A1    Sep. 16, 2004

Related U.S. Application Data

(60) Provisional application No. 60/446,260, filed on Feb. 11, 2003.

(51) Int. Cl.
*G06F 9/44* (2006.01)
*G06F 9/00* (2006.01)
*G06F 7/00* (2006.01)
*G06F 12/14* (2006.01)

(52) U.S. Cl. .................. 717/124; 717/130; 712/227; 713/189; 713/190

(58) Field of Classification Search ............ None
See application file for complete search history.

(56) References Cited

U.S. PATENT DOCUMENTS

| | | | |
|---|---|---|---|
| 5,940,590 A | | 8/1999 | Lynne et al. |
| 5,978,902 A | * | 11/1999 | Mann .................. 712/227 |
| 6,009,543 A | | 12/1999 | Shavit |
| 6,701,439 B1 | * | 3/2004 | Dunn .................. 380/255 |
| 6,742,177 B1 | * | 5/2004 | Dorak et al. ............ 717/124 |
| 6,839,654 B2 | * | 1/2005 | Rollig et al. ........... 702/178 |
| 7,149,900 B2 | * | 12/2006 | Rothrock ............... 713/189 |
| 2003/0140241 A1 | * | 7/2003 | England et al. ......... 713/194 |

(Continued)

OTHER PUBLICATIONS

Aucsmith, David; "Tamper Resistant Software: An Implementation", 1996, ACM retrieved from scholar.google.com Mar. 12, 2007.*

(Continued)

*Primary Examiner*—Mary Steelman
(74) *Attorney, Agent, or Firm*—Brian M. Dingman; Mirick, O'Connell, DeMallie & Lougee, LLP (57) ABSTRACT

A method for regulating execution of an application program includes a process for preparing the application and a process for executing the application. The preparation process divides the application program into related segments and encrypts instructions of at least one segment. The preparation process positions encrypted instructions in at least two discontiguous regions within an executable file and associates header information with at least one discontiguous region. The header identifies a decryption key and the location of the other discontiguous region. The resulting execution file thus has portions that would not execute and would cause an operating system to call a responsive process. The execution process initiates execution of the protected application when at least a portion of the application instructions are available to the computer only in encrypted form. The user is authenticated, after which the encrypted portions can be decrypted and execution resumed. The processes may also include capability to detect and respond to tampering, or the ability to block execution snooping via a debugger.

23 Claims, 4 Drawing Sheets

U.S. PATENT DOCUMENTS

| | | |
|---|---|---|
| 2004/0015958 A1 | 1/2004 | Veil et al. |
| 2004/0054901 A1* | 3/2004 | England et al. ............. 713/168 |
| 2005/0166069 A1* | 7/2005 | Hashimoto et al. ......... 713/194 |
| 2005/0204348 A1* | 9/2005 | Horning et al. ............. 717/140 |
| 2006/0248353 A1* | 11/2006 | Shear et al. ................. 713/194 |

OTHER PUBLICATIONS

Ogiso, Toshio; Sakabe, Yusuke; Soshi, Masakazu; Miyaji, Atsuko; "Software Tamper Resistance Based on the Difficulty of Interprocedural Analysis", 2002, retrieved from scholar.google.com Mar. 12, 2007.*

Wang, Chenxi; Hill, Jonathan; Knight, John; Davidson, Jack; "Software Tamper Resistance: Obstructing Static Analysis of Programs", p. 1-18, 2000, retrieved from scholar.google.com Mar. 12, 2007.*

Microsoft Computer Dictionary, Fifth Edition, 2002, p. 148.*

*Tamper Resistant Software: An Implementation*, by David Aucsmith, *Lecture Notes in Computer Science 1174*, pp. 317-333, from Lecture Notes in Computer Science 1174, Ross J. Anderson (Ed.), *Information Hiding*, First International Workshop, Cambridge, U.K., May/Jun. 1996 Proceedings. Springer 1996 ISBN 3-540-61996-8.

* cited by examiner

SYSTEM AND METHOD FOR REGULATING EXECUTION OF COMPUTER SOFTWARE

CROSS-REFERENCE TO RELATED APPLICATIONS

The present application claims priority under 35 U.S.C. § 119 (e) to U.S. Provisional Patent Application Ser. No. 60/446,260, filed on Feb. 11, 2003, the disclosure of which is expressly incorporated by reference herein in its entirety.

BACKGROUND

This invention relates to a system and method for regulating execution of computer software, and computer programs having programming structures related to such regulation.

SUMMARY

The preferred embodiment(s) of the invention are summarized here to highlight and introduce some aspects of the present invention. Simplifications and omissions may be made in this summary. Such simplifications and omissions are not intended to limit the scope of the invention.

A compiler-like post processor program takes an existing application program as input and scans it for function entry points and calls to entry points. The post processor encrypts functions in the application, scrambles information about the locations of the function code, adds a decryption routine, adds tamper detection and response code, and writes out a partially-encrypted executable file. Protected functions in the protected application program have information written into their headers that the operating system will interpret as illegal instructions so that the functions would not validly execute, even if the modules were decrypted. The new executable launches and behaves just like the original application, but must have the decryption key(s) in order to run successfully. The post processor can set up the protected application to obtain the decryption key(s) directly from the user, from a key server, from a file, or by a variety of other means.

Instead of a post-processor, source code for an application can be written in the first instance with protection features, compiled, and encrypted.

The Execution Controller interacts with the operating system as a debugger and controls the execution of the application. Execution control is transferred to a debugger/decryption routine (hereafter called an Execution Controller) when the operating system detects an illegal address, instruction, or modified opcode in a protected executable file.

The Execution Controller has its own code for managing decryption and tamper protection. The Execution Controller also prevents the user from loading his own instantiation of a debugger to take control of the application. The Execution Controller detects whether there have been any attempts to tamper with the protected executable and responds to tampering. At the discretion of the individual who has handled the protection of the application, a tampered application can either be allowed to continue to run or degrade in a manner which will hinder the tamperer or hacker from obtaining information about the nature of the protection which has been applied.

After a decrypted function has completed execution, control is returned back to the Execution Controller, which either removes the decrypted version of the module from the paging space of the operating system or re-encrypts it.

A benefit of this method is that it denies an attacker access to the entire application in decrypted form. It makes it virtually impossible for them to get information which will enable them to modify the application so that they can eliminate or circumvent the protections and/or features which the copyright holder or owner of the application chooses to apply. It provides detection and countermeasures in the event that attempts are made to tamper with or modify the protected program. Another advantage of the disclosed system and method is an ability to process an existing computer software application without having access to source code or other a priori knowledge of internal program structure.

These and other objects will become apparent from the figures and written description contained herein.

BRIEF DESCRIPTION OF THE DRAWINGS

Preferred embodiment(s) of the invention will be discussed below with reference to attached drawings in which.

DETAILED DESCRIPTION OF THE PREFERRED EMBODIMENTS

An Operating System (OS) is a set of computer programs and routines that guides a computer or network in the performance of its tasks. Versions of Microsoft Windows™, such as Windows 2000™, Windows NT™, and Windows XP™, are examples of operating systems. Other operating systems are known.

An Application Program (AP) is a program written to perform a specific task, solve a specific problem, produce a specific report, or update a specific file. Microsoft Word™, Microsoft Excel™, and Microsoft PowerPoint™ are examples of application programs. Other applications are known.

Operating systems and application programs each may assume control over computer resources at various times. An OS typically assumes control over computer resources when the computer first boots. An OS may cede control of some or all computer resources to an AP, depending on the design of the AP. In a multi-tasking OS, the OS and multiple APs may seize and release computer resources at various times depending on the OS design, the AP design, and external events. Operating systems normally regain control over computer resources after APs terminate.

Most present-day operating systems provide a capability to respond to irregular execution of an AP. An AP may cause an irregular event, sometimes called an exception. Exceptions may occur because of hardware faults, e.g., causing an illegal arithmetic operation, such as division by zero. Exceptions may also occur because of unavailability of computer resources, or other reasons. The OS may halt an AP, assume control of computer resources, or take other action in the event of an exception.

Most present-day operating systems also provide capabilities for assisting in debugging applications. Microsoft operating systems, for example, have an application program interface with a number of functions related to debugging. An AP can be programmed with a command for a breakpoint. When the AP executes a breakpoint command, the OS halts execution of the AP. The OS may then transfer control to a debugger application. (The OS may also pass control to a debugger application in response to other exception events.) While the AP is halted, the OS may give a debugger application access to memory locations and other computer resources allocated to the AP, including an ability to change instructions in memory. The debugger application can instruct the OS to resume execution of AP. Other functions may be available depending on the particular OS. In some operating systems, only a single debugger program may be associated with an AP at a given time.

Figure 1:
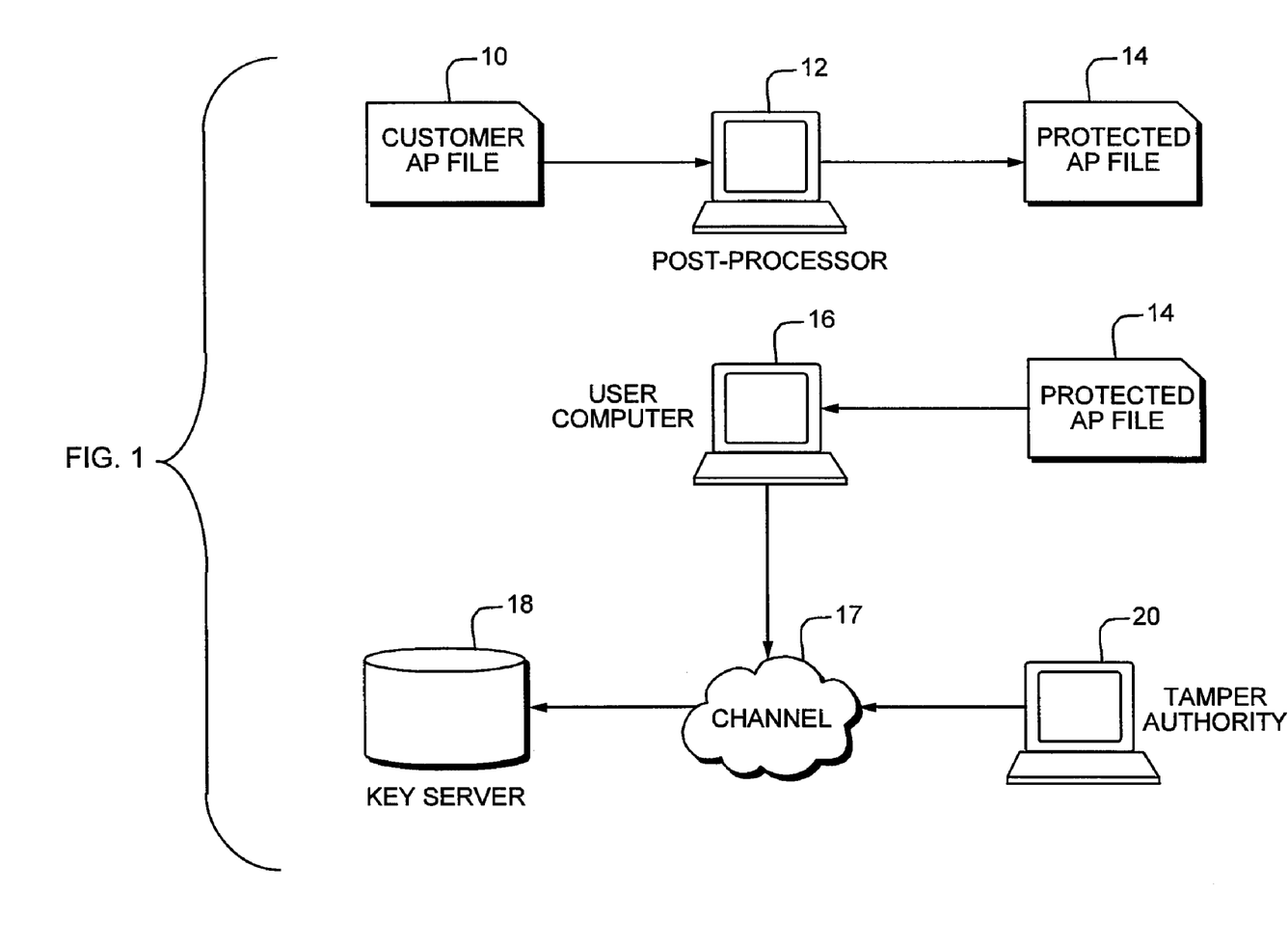
FIG. 1 illustrates a process for modifying an application program for the purpose of regulating its execution.

FIG. 1 illustrates a process for modifying an AP for the purpose of regulating its execution. The goal of such regulation is not to debug the AP, but to limit execution to authorized users. For example, the person or company who creates the AP might charge a fee for its use. Alternately, export of some computer programs outside the U.S. may be restricted. The purpose of regulation is to prevent pirates, hackers, thieves, and other unauthorized users from using the AP, and to detect or respond to tampering.

The first part of the regulation process modifies AP executable instruction sequences. The example provided in FIG. 1 is for an AP that has already been programmed, debugged, and compiled into an executable file. Alternately, an AP can be written initially to utilize the execution regulation features described below. The executable AP will be referred to as a customer AP file 10.

A post-processor program 12 analyzes the customer AP file 10 to identify functions and other natural partitions within the program. In general terms, the post-processor program 12 modifies the customer AP file 10 to include regulatory features based on innate capabilities of the OS to regulate execution of applications.

Examples of such features are discussed further below. The post-processor program 12 augments the modified AP with additional executable instructions. The modified customer AP file will be referred to as a protected AP file 14.

The second part of the regulation process occurs when executing the protected AP file 14 on a user computer 16. In general terms, executable instructions added to the protected AP file 14 during post-processing interact with instructions of the customer AP file 10 and with the OS of the user computer 16. The protected AP file 14 may include processes that can communicate through an external channel 17 as part of an authentication process, such as to a decryption key server 18. The protected AP file 14 may additionally include processes to respond to any detected tampering of the protected AP file 14 and to report such tampering to an authority 20.

Figure 2:
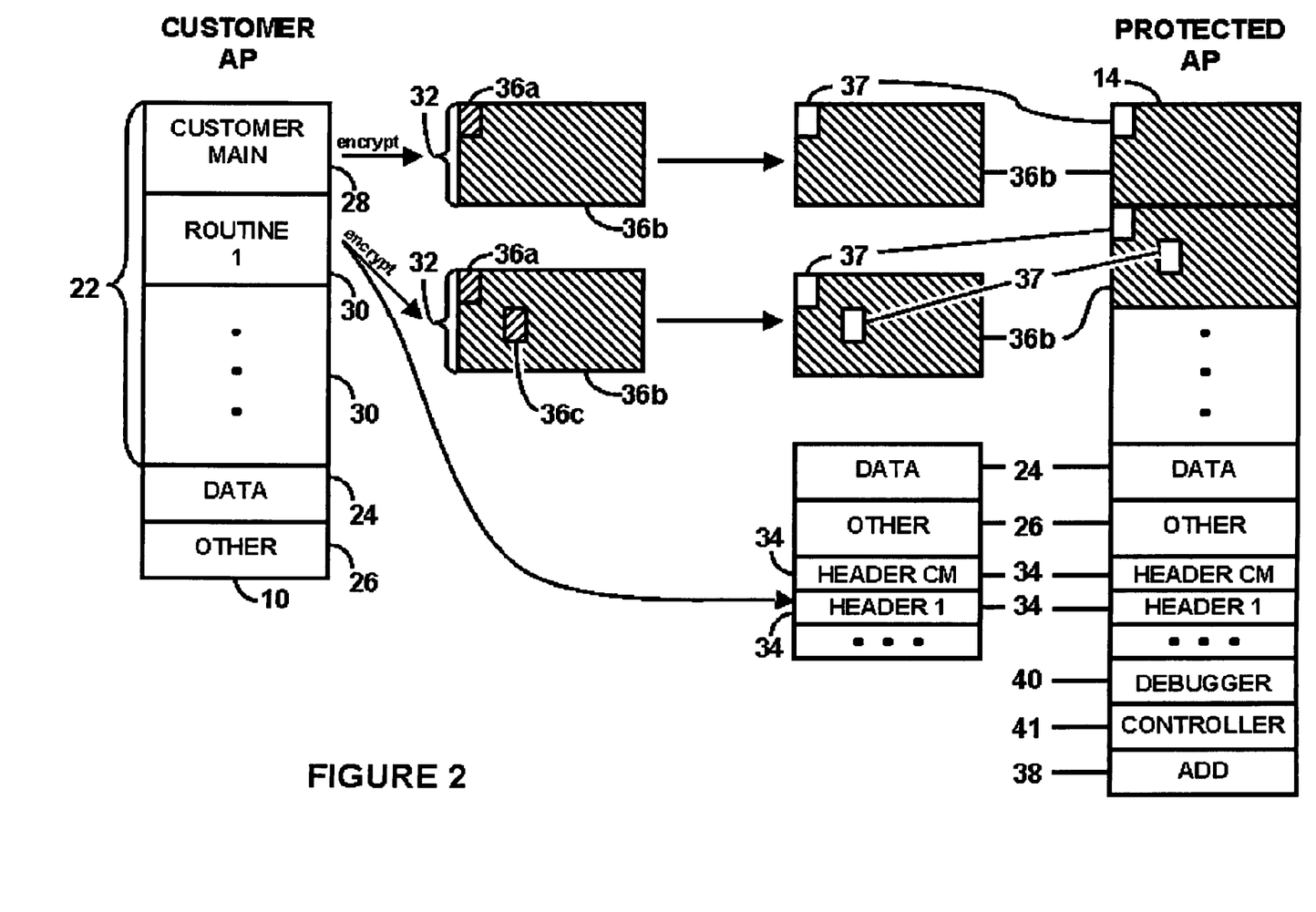
FIG. 2 illustrates structural components of a customer application program file and their conversion into a protected executable file.

FIG. 2 illustrates structural components of a customer AP file 10 and their conversion into a protected AP file 14. Executable files typically have a defined structure depending on the processing environment in which they were intended to operate. In the example of FIG. 2, the customer AP file includes a section of executable code 22, a section of data 24, and another section containing other components 26. The section of executable code 22 typically includes a main routine 28 and a series of additional routines 30. Files could be in other formats, such as libraries.

The post processor program reads the customer AP file 10 and identifies natural boundaries in the executable code. Function boundaries may be jump or call entry points and return instructions. The post processor traces through the executable for jump, call, and other branch or flow control instructions, locates the associated entry points, and examines the subsequent code for return instructions. The post processor stores a record of all function entry points and function lengths, as well as any flow-control instructions that refer to the function. Where a function has multiple entry points, the post processor merges overlapping functions into a single one. If a priori information is available about the customer application (in addition to the executable code itself), the process of identifying natural boundaries can be done other ways. For example, if source code is available, the source code can be examined manually to identify function boundaries or, if debugging information is available, the debugging information can be scanned to identify function boundaries.

After identifying functions, the post processor encrypts some or all of them into cipher-text functions 32. The number of functions to be encrypted may vary according to the nature of the application. The number may be a fixed percentage of functions. Functions having highest call rates may be encrypted (e.g., those called from many different locations within the AP). Functions may also be selected to permit a minimum functionality, such as an ability to launch and read data, but not to write or store data. The selection process need not be automatic. It can involve human intervention and analysis.

Each function is encrypted separately, possibly using a distinct encryption key for each. The encryption and decryption scheme can employ any of a wide variety of encryptions algorithms such as RSA, MD5, RC4, and others. Encryption can be accomplished by software or specialized hardware devices.

For each cipher-text function 32, the post processor preferably substitutes an interrupt instruction 37 for the OS under which the AP was written to run, for the first byte or bytes of the cipher-text 36a as well as for any secondary entry points 36c that may exist in the plain text function.

The post processor also generates a plain-text header 34 for each cipher-text function 32. The plain-text header 34 includes information to identify a decryption key for the function, the length of the function, a checksum for the plain-text (pre-encryption) functions, and a checksum for the cipher-text function. Bytes of the plain-text header are obfuscated using any of a number of known techniques such as byte swapping or encryption. Information to allow descrambling is included in the protected AP file in a way that hinders detection.

The post-processor substitutes the interrupt instruction 37 for an amount of cipher-text function. The resultant function module will thus be a combination of interrupt instruction 37 and a portion 36b of cipher-text subroutine. Preferably, the total length of the combination module will be equal to the length of the original plain-text function. For example, suppose that (a) the plain-text function had a length of 128 bytes, (b) the encryption process generated an equal-length cipher-text function of 128 bytes, and (c) an interrupt instruction is two bytes. The post processor program would replace an amount of cipher-text function equal in length to two bytes.

The post-processor program stores the substituted portion of cipher-text function 36a and 36c to a known location in the executable file such as the end of the code section. The post-processor also stores within the plain text header an offset (relative address) to the displaced cipher text.

The post-processor combines the composite functions (i.e., those interrupt instructions 37 and cipher-text portions 36b) with functions of an additional program called the Execution Controller 40. The post processor may also alter entry-point addresses to reflect moved functions. The functions of the Execution Control 40 will be described more fully below.

Figure 3:
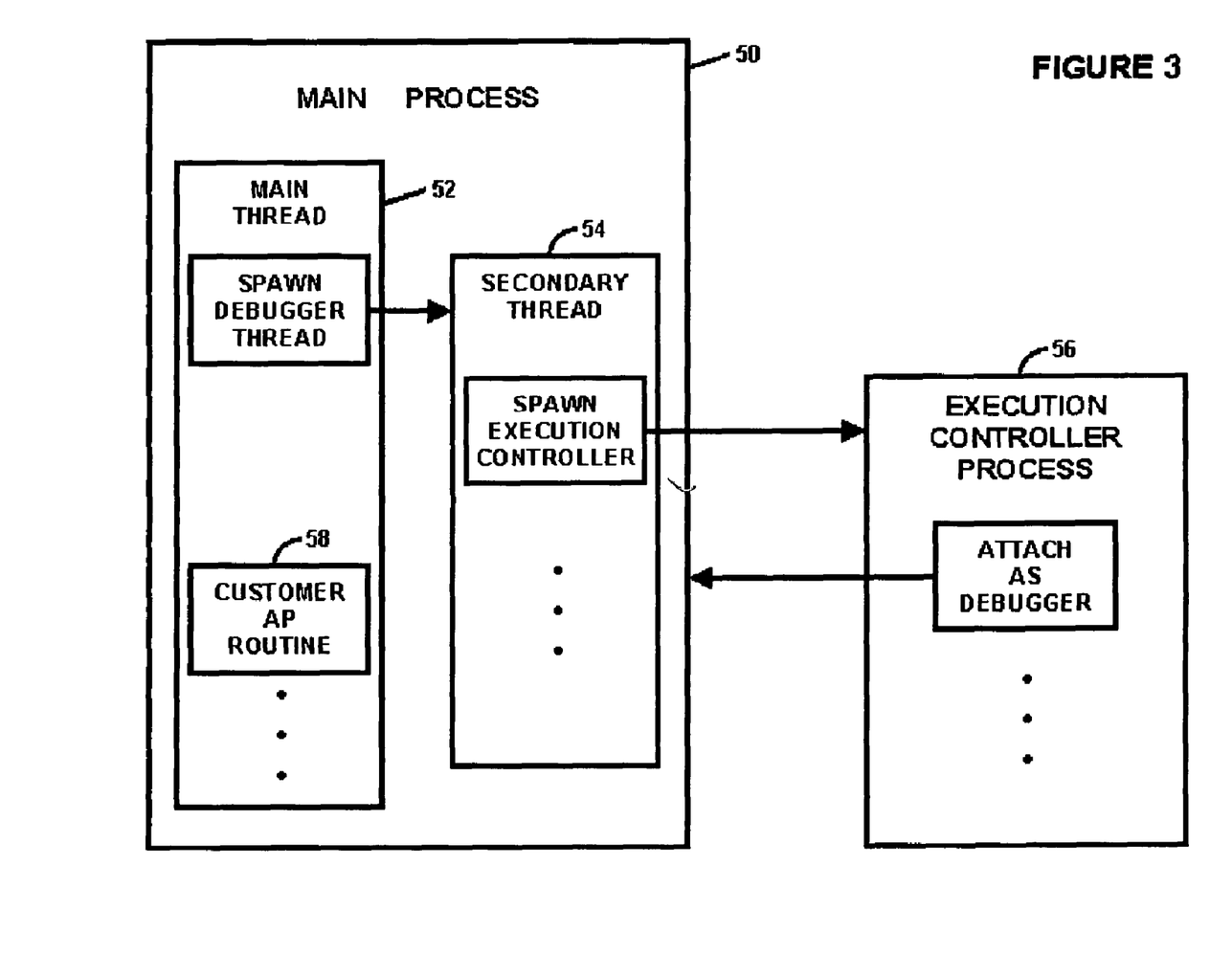
FIG. 3 illustrates a process environment for running the protected application program file on a user computer.

FIG. 3 illustrates a process environment for running the protected AP file on a user computer. The example given is for a Microsoft Windows™ environment. Upon invocation of the AP file, the user computer starts a Main Process 50 for the protected AP. The Main Process 50 has a main thread 52 which immediately spawns a secondary thread 54. The secondary thread 54 in turn spawns a new process 56 for the Execution Controller. The Execution Controller immediately attaches to the Main Process 50 as a debugger. No other debugger can attach to the Main Process 50, because the Execution Controller 56 is now attached. No debugger can attach to the Execution Controller 56, because of the kernel protections it was spawned with.

After the Execution Controller attaches to the Main Process 50, the main thread of the Main Process commences execution of the routines of the customer application 58. Thereafter, the Execution Controller 56 will have a context within the OS of a debugger. The routines of the customer application 58 will have the context of an application being debugged.

Figure 4:
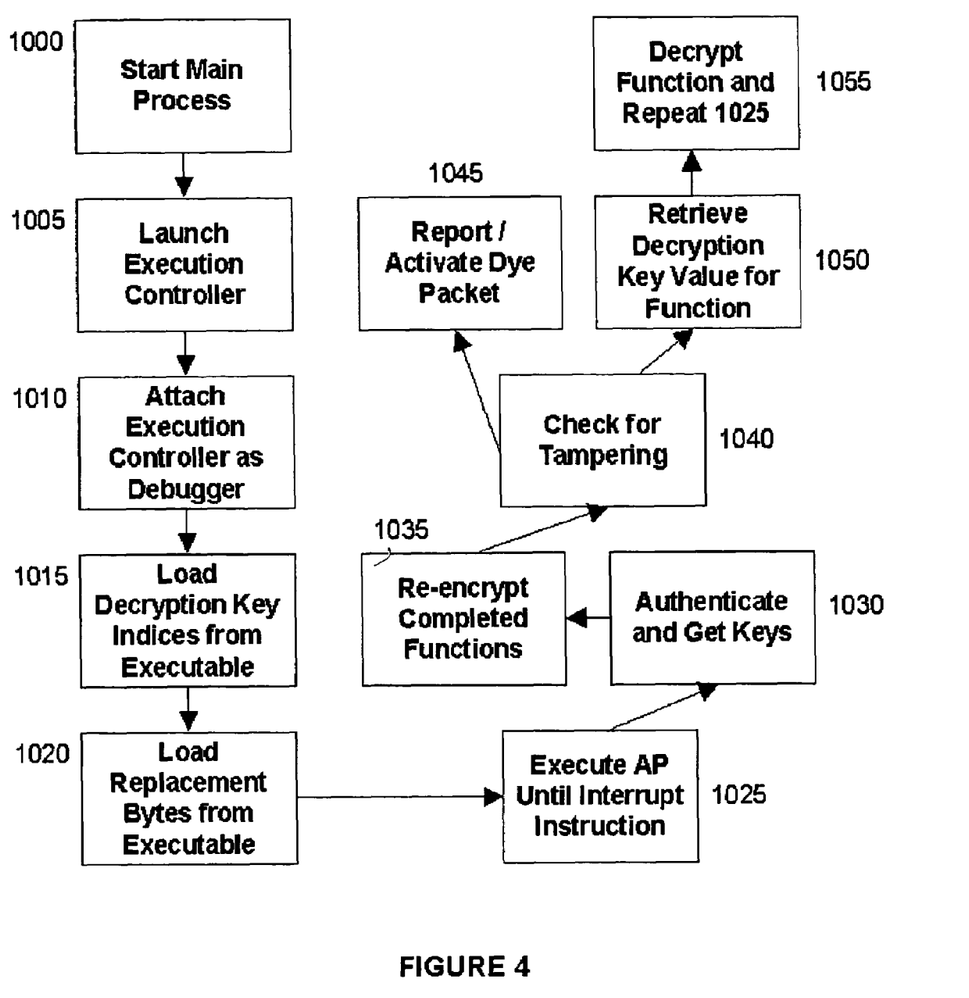
FIG. 4 illustrates steps in executing a protected application program.

FIG. 4 illustrates steps in executing a protected application program. As discussed above, the Main Process starts 1000, which in turn launches the Execution Controller 1005. The Execution Controller attaches to the main process as a debugger 1010.

The Execution Controller may then obtain key indices (key identifiers) from headers or elsewhere within the protected AP file 1015. The Execution Controller may then also retrieve the corresponding cipher-text displaced by headers from the protected AP file 1020.

The Main Process executes instructions of the customer AP until it encounters a breakpoint in a protected function 1025. The breakpoint halts execution of the main thread of the Main Process.

The first time the Execution Controller encounters an encrypted function, the Execution Controller initiates a process 1030 to authenticate the user and obtain cryptographic keys. The authentication process may be any of many known authentication processes. One such process is for the Execution Controller first to authenticate the user to the computer, such as by a password, smart card, or other method. The Execution Controller then contacts an external server and verifies whether the user is authorized to use the application.

If the user is authorized, the Execution Controller downloads or otherwise obtains one or more decryption keys for the protected AP file from the key server. The key server may encrypt the keys for transmission using a separate communication key. The communication key may be included in the protected AP file, provided with a smart card to the user, developed interactively during a communication session with the key server, or obtained some other way. The Execution Controller may obtain all decryption keys in one or more communication session. The Execution Controller may obtain keys in other ways, such as from within the protected AP itself, from a smart card provided to the user, or from another source. The Execution Controller stores the decryption keys using any of many known protection techniques. The Execution Controller may also obtain encryption keys for use in re-encrypting functions as discussed below.

Upon encountering breakpoints, the Execution Controller checks any previously-decrypted customer application functions and purges or re-encrypts any that have completed execution 1035. The Execution Controller can determine whether any such functions have finished by comparing the instruction counter of the Main Process main thread to a map of active function entry and return points. The Execution Controller can overwrite completed routines with cipher-text versions. The cipher text can be retrieved from long term storage or retained in more readily-accessible memory by the Execution Controller. If the nature of the function includes changing local variables, the Execution Controller can re-encrypt the module with current variable values. Re-encryption can be accomplished using software on a specialized hardware device After user authentication and function re-encryption (if any), the Execution Controller checks the newly-encountered function for tampering 1040. The Execution Controller verifies checksums, such as checksums for plain-text and cipher-text functions. Other tamper detection schemes may be used.

If the Execution Controller detects tampering, it undertakes any of various responses 1045. One response is to activate a so-called "dye packet." A dye packet is code to assist in proving unauthorized activity, such as by sending a report to an authority. The Execution Controller can communicate a report identifying the user, the application in which tampering was detected, and the nature of the detected tampering (e.g., failed plain-text checksum). The Execution Controller can also terminate the execution of the application, either temporarily or permanently. This termination can be done at a random time after detection so as to limit information available to a hacker about tamper detection methods. The Execution Controller can even delete the protected application from permanent storage.

In the absence of detected tampering, the Execution Controller retrieves the decryption key for the function 1050. The Execution Controller builds a cipher-text buffer from the appropriate replacement bytes and the encrypted bytes of the function not overwritten by the header information. The Execution Controller decrypts the cipher-text function 1055 and writes the plain-text instructions back into the instruction memory for the Main Process main thread. The Execution Controller resets the instruction counter to resume execution. The Main Process will resume execution normally using the plain-text instructions.

The Main Process main thread resumes execution until it encounters another breakpoint 1025. At that time, the Main Process will again halt and notify the Execution Controller. The Execution Controller repeats steps of re-encrypting completed functions 1035, detecting and responding to tampering 1040, 1045, and decrypting newly encountered functions 1050, 1055. This process repeats throughout execution of the customer AP.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the disclosure, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses.

What is claimed is:

1. A process for modifying an application computer program that includes a plurality of subsections having boundaries, said application computer program configured to run under the control of an operating system, said process steps comprising:
   substituting an operating system instruction that causes an interrupt for one or more bytes of at least one subsection;
   relocating the substituted bytes to a location in the application computer program that is distinct from the boundaries of the subsection; and
   adding an execution controller computer program into the application computer program;
   where the execution controller computer program is configured to be launched by the application computer program, and where the execution controller computer program, once launched, uses an operating system debugger interface to attach the execution controller computer program to the application computer program and restores the operating system instruction that causes an interrupt with the substituted bytes.

2. The process of claim 1, further comprising the step of: identifying the boundaries of the at least one subsection.

3. The process of claim 2, where one of the boundaries is a flow control instruction.

4. The process of claim 1, further comprising the step of: encrypting at least a portion of at least one subsection.

5. The process of claim 4, further comprising the step of: adding information used to decrypt the encrypted portion to the application computer program.

6. The process of claim 1, further comprising the step of: adding tamper detection instructions and data to the application computer program file.

7. A process for executing an application computer program defining a plurality of subsections, said application computer program configured to run under the control of an operating system and incorporating an execution controller computer program, said process steps comprising:
   substituting an operating system instruction that causes an interrupt for one or more bytes of at least one subsection;
   launching the application computer program;
   launching the execution controller computer program, where the execution controller computer program is launched by the application computer program;
   attaching the execution controller computer program to the application computer program using the operating system debugger interface; and
   executing the application computer program until an operating system instruction that causes an interrupt is encountered;
   after an operating system instruction that causes an interrupt is encountered, restoring the operating system instruction that causes an interrupt with the substituted bytes; and
   resuming execution of the application computer program, starting at the restored bytes.

8. The process of claim 7, further comprising the step of: after an operating system instruction that causes an interrupt is encountered, resuming execution of the application computer program.

9. The process of claim 7, further comprising the step of: after an operating system instruction that causes an interrupt is encountered, terminating the execution of the application computer program.

10. The process of claim 7, further comprising the step of: after an operating system instruction that causes an interrupt is encountered, authorizing a continued execution of the application computer program.

11. The process of claim 10, where the step of authorizing a continued execution of the application computer program comprises authenticating a user of the application computer program.

12. The process of claim 7, where at least a portion of the at least one subsection has been encrypted, further comprising the steps of:
    after an operating system instruction that causes an interrupt is encountered, decrypting the encrypted portion; and
    executing the decrypted subsection.

13. The process of claim 12, further comprising the step of:
    re-encrypting the decrypted subsection.

14. The process of claim 12, where at least a portion of the information used to decrypt the encrypted portion is obtained from a key server computer program.

15. The process of claim 12, where at least a portion of the information used to decrypt the encrypted portion is obtained from a location in the application computer program.

16. The process of claim 7, further comprising the steps of:
    after an operating system instruction that causes an interrupt is encountered, detecting if there has been tampering of the application computer program; and
    if tampering has been detected, reporting information related to the tampering to a user of the application computer program.

17. The process of claim 7, further comprising the steps of:
    after an operating system instruction that causes an interrupt is encountered, detecting if there has been tampering of the application computer program; and
    if tampering has not been detected, resuming execution of the application computer program.

18. A process for executing an application computer program that includes a plurality of subsections having boundaries, said application computer program configured to run under the control of an operating system, said process steps comprising:
    substituting an operating system instruction that causes an interrupt for one or more bytes of at least one subsection;
    relocating the substituted bytes to a location in the application computer program this is distinct from the boundaries of the subsection;
    adding an execution controller computer program into the application computer program;
    launching the application computer program;
    launching the execution controller computer program, where the execution controller computer program is launched by the application computer program;
    attaching the execution controller computer program to the application computer program using the operating system debugger interface;
    executing the application computer program until an operating system instruction that causes an interrupt is encountered;

after an operating system instruction that causes an interrupt is encountered, restoring the operating system instruction that causes an interrupt with the substituted bytes; and resuming execution of the application computer program, starting at the restored bytes.

19. The process of claim 18, further comprising the steps of:

encrypting at least a portion of at least one subsection of the application computer program; and after an operating system instruction that causes an interrupt is encountered, decrypting the encrypted portion.

20. The process of claim 18, further comprising the steps of:

adding tamper detection instructions and data into the application computer program;

after an operating system instruction that causes an interrupt is encountered, detecting if there has been tampering of the application computer program; and if tampering has been detected, terminating the execution of the application computer program.

21. The process of claim 18, further comprising the steps of:

adding tamper detection instructions into the application computer program;

after an operating system instruction that causes an interrupt is encountered, detecting if there has been tampering of the application computer program; and if tampering has been detected, reporting the tampering to a user of the application computer program.

22. The process of claim 18, further comprising the steps of:

after an operating system instruction that causes an interrupt is encountered, authenticating a user of the application computer program; and if the user of the application computer program is authenticated, resuming the execution of the application computer program.

23. The process of claim 18, further comprising the steps of:

after an operating system instruction that causes an interrupt is encountered, authenticating a user of the application computer program; and if the user of the application computer program is not authenticated, terminating the execution of the application computer program.

* * * * *